(12) United States Patent
Hoff

(10) Patent No.: US 10,815,621 B2
(45) Date of Patent: Oct. 27, 2020

(54) METHOD FOR PRODUCING A DECORATED SHEET AND USE THEREOF

(71) Applicant: SURFACE TECHNOLOGIES GMBH & CO. KG, Baruth (DE)

(72) Inventor: Egon Hoff, Mastershausen (DE)

(73) Assignee: Surface Technologies GMBH & Co. KG (DE)

( * ) Notice: Subject to any disclaimer, the term of this patent is extended or adjusted under 35 U.S.C. 154(b) by 981 days.

(21) Appl. No.: 14/389,930

(22) PCT Filed: May 6, 2013

(86) PCT No.: PCT/EP2013/059388
§ 371 (c)(1),
(2) Date: Oct. 1, 2014

(87) PCT Pub. No.: WO2013/167533
PCT Pub. Date: Nov. 14, 2013

(65) Prior Publication Data
US 2015/0068671 A1    Mar. 12, 2015

(30) Foreign Application Priority Data

May 10, 2012    (DE) .................... 10 2012 207 845

(51) Int. Cl.
*D21H 25/02*    (2006.01)
*D21H 25/06*    (2006.01)
(Continued)

(52) U.S. Cl.
CPC ............. *D21H 25/02* (2013.01); *B32B 3/30* (2013.01); *B32B 29/06* (2013.01); *B32B 37/18* (2013.01);
(Continued)

(58) Field of Classification Search
CPC ....... B32B 38/06; B32B 38/004; B32B 38/08; B32B 38/145; B32B 2260/028;
(Continued)

(56) References Cited

U.S. PATENT DOCUMENTS

| 7,192,653 B2 | 3/2007 | Schnieder et al. |
| 8,641,849 B2 | 2/2014 | Buhlmann |

(Continued)

FOREIGN PATENT DOCUMENTS

| EP | 0745478 A2 | 12/1996 |
| EP | 1319524 A1 | 6/2003 |

(Continued)

OTHER PUBLICATIONS

Handbook of Industrial Drying, Third Edition,I.1.5. Classification and Selection of Dryers, pp. 26, Arun S . Mujumdar, CRC Press 2006, Print ISBN: 978-1-57444-668-5, eBook ISBN: 978-1-4200-1761-8' DOI: 10.1201/9781420017618.*

(Continued)

*Primary Examiner* — Carson Gross
(74) *Attorney, Agent, or Firm* — Stinson LLP

(57) ABSTRACT

Decorated sheets on the basis of cellulose non-woven fabrics, such as paper, for the production of decorated laminates are impregnated with synthetic resins. Consequently, their sizes are changed, they become brittle and are not water-resistant in the laminate. In the method according to the invention the printed or unprinted non-woven fabrics are impregnated with an aqueous dispersion of a polymer which is cross-linkable by UV radiation, dried and optionally printed and finally irradiated with UV radiation. The decorated sheets thus obtained are water-resistant in the laminate and can be coiled up and stored after each process step.

23 Claims, 2 Drawing Sheets

(51) Int. Cl.
*D21H 27/28* (2006.01)
*D21H 17/33* (2006.01)
*B32B 29/06* (2006.01)
*C08J 5/24* (2006.01)
*D21H 17/34* (2006.01)
*B32B 3/30* (2006.01)
*B44C 5/04* (2006.01)
*B32B 37/18* (2006.01)
*B32B 38/00* (2006.01)
*B32B 38/06* (2006.01)
*B41F 1/00* (2006.01)
*B41J 2/00* (2006.01)
*D21H 27/18* (2006.01)
*D21H 27/30* (2006.01)
*D21H 17/49* (2006.01)
*B32B 38/08* (2006.01)

(52) U.S. Cl.
CPC ............ *B32B 38/004* (2013.01); *B32B 38/06* (2013.01); *B32B 38/08* (2013.01); *B32B 38/145* (2013.01); *B41F 1/00* (2013.01); *B41J 2/00* (2013.01); *B44C 5/0446* (2013.01); *C08J 5/24* (2013.01); *D21H 17/33* (2013.01); *D21H 17/34* (2013.01); *D21H 25/06* (2013.01); *D21H 27/28* (2013.01); *B32B 2255/12* (2013.01); *B32B 2255/26* (2013.01); *B32B 2260/028* (2013.01); *B32B 2260/046* (2013.01); *B32B 2262/062* (2013.01); *B32B 2305/72* (2013.01); *B32B 2307/404* (2013.01); *B32B 2307/4023* (2013.01); *B32B 2307/714* (2013.01); *B32B 2307/718* (2013.01); *B32B 2307/734* (2013.01); *B32B 2307/75* (2013.01); *B32B 2310/0825* (2013.01); *B32B 2310/0831* (2013.01); *B32B 2310/0862* (2013.01); *B32B 2451/00* (2013.01); *B44C 5/0469* (2013.01); *C08J 2300/24* (2013.01); *D21H 17/49* (2013.01); *D21H 27/18* (2013.01); *D21H 27/30* (2013.01); *Y10T 156/1041* (2015.01)

(58) Field of Classification Search
CPC ........ D21H 27/18; D21H 27/30; D21H 25/06; D21H 17/47; D21H 17/49; D21H 17/57; B44C 5/0469
See application file for complete search history.

(56) References Cited

U.S. PATENT DOCUMENTS

| | | | |
|---|---|---|---|
| 9,091,025 B2 * | 7/2015 | Voncken | D21H 19/20 |
| 2004/0197591 A1 * | 10/2004 | Schnieder | C08J 5/24 |
| | | | 428/526 |
| 2004/0247829 A1 * | 12/2004 | Depres | D21H 19/66 |
| | | | 428/141 |
| 2006/0240247 A1 | 10/2006 | Haller | |
| 2010/0040841 A1 | 2/2010 | Haller | |
| 2010/0282407 A1 * | 11/2010 | van der Zwan | D21H 27/26 |
| | | | 156/277 |
| 2011/0159208 A1 * | 6/2011 | Price | B44C 5/0469 |
| | | | 427/557 |
| 2011/0249055 A1 * | 10/2011 | Sasada | C09D 11/101 |
| | | | 347/20 |
| 2011/0300351 A1 | 12/2011 | Suur-Nuuja et al. | |
| 2013/0078437 A1 * | 3/2013 | Symkens | B44C 1/00 |
| | | | 428/203 |
| 2014/0199529 A1 | 7/2014 | Hoff | |

FOREIGN PATENT DOCUMENTS

| | | |
|---|---|---|
| GB | 1233397 A | 5/1971 |
| JP | S5086571 A | 7/1975 |
| JP | H09188997 A | 7/1997 |
| JP | H09290487 A | 11/1997 |
| JP | H10138439 A | 5/1998 |
| JP | 2001129957 A | 5/2001 |

OTHER PUBLICATIONS

Abstract of JP55086571; Jul. 11, 1975.
International Search Report, PCT/EP2013/059388, dated Aug. 27, 2013, 3 pages.
International Preliminary Report on Patentability, PCT/EP2013/059388, dated Nov. 11, 2014, 5 pages.
Written Opinion, PCT/EP2013/059388, dated Aug. 27, 2013, 4 pages.

* cited by examiner

METHOD FOR PRODUCING A DECORATED SHEET AND USE THEREOF

REFERENCE TO RELATED APPLICATION

This application is a U.S. national stage application of International Patent Application No. PCT/EP2013/059388, filed May 6, 2013, and claims the benefit of German Application No. 102012207845.2, filed May 10, 2012, the entire disclosures of which are incorporated herein by reference.

FIELD OF THE INVENTION

The invention relates to a method for producing a decorated sheet, as is used in the production of decorative laminates with other layers, for example carrier layers made of wood, wood-based materials, plastics as well as cover or protective layers. Such decorative laminates are used for example as wall or floor coverings and in the furniture construction. The invention also relates to the use of the decorated sheet in the production of a decorative laminate.

BACKGROUND OF THE INVENTION

In such laminates, the decor can imitate another material, for example wood, ceramic, natural or artificial stone, or can take into consideration artistic or practical aspects. Usually the decor is protected against wear by a more or less transparent duroplastic layer. It is also common to provide the surface of the cover layer with a structure that is in spatial relation to the decor, simulates the surface structure of the imitated material and is known as synchronous pore.

The decoration is realized conventionally in the form of a printed paper or a paper otherwise provided with a pattern or other cellulose non-woven fabric, which is impregnated with a curable varnish or a synthetic resin and is disposed between the carrier and a wear-inhibiting outer cover layer. Usually the production of the impregnated decorative paper requires separate production steps of printing and impregnation, which are usually carried out in factories outside the actual laminate production and represent a significant cost factor. It is also necessary that the impregnating material of the decorative paper is compatible with the varnish or synthetic resin of the cover layer, which in particular cannot be expected in contacting varnish and synthetic resin.

Another problem with this technology is that in the impregnation of the decorative paper the paper undergoes a dimensional change, which has to be taken into consideration in the further process when the spatial relationship between the decor and the surface structure (synchronous pore) has to be maintained. This is particularly difficult when the product is changed frequently.

Decorative papers impregnated with aminoplast are also sensitive to water that penetrates into the laminate by bypassing the cover layer from a cutting edge. For applications in wet areas such laminate elements have also to be sealed specifically against penetrating water at the side edges.

Finally, the decorative papers often lose their flexibility due to the impregnation and can no longer be coiled, but have to be handled in the form of sheets which are cut to the size of the carrier.

DE 17 04 598 A describes a method for the continuous production of fiber-reinforced plastic sheets, wherein non-woven fabrics are impregnated with a synthetic resin comprising self-cross-linking groups and are subsequently subjected to a heat and compression treatment.

DE 101 34 302 C1 discloses a method for producing a prepreg for the production of decorative laminates, wherein a heat-curable resin is applied to a non-coated paper, and the prepreg is adjusted to a residual moisture of about 3%, wherein the resin remains non-cross-linked.

WO 2010/089 086 A1 describes a method for producing a decorative paper, wherein the paper is printed and subsequently an aliphatic, polycarbonate-containing anionic polyurethane dispersion is applied. Thereafter, the paper is impregnated with an aminoplast resin. This is intended to save impregnating resin, to reduce the growth of the paper upon impregnation with aminoplast resin and to improve the light fastness of the decorative paper.

SUMMARY OF THE INVENTION

It is an object of the invention to provide a method for producing a decorated sheet of a cellulose non-woven fabric, which results in a complete and water-resistant impregnation of the cellulose and can be implemented in a simpler way in comparison with the prior art.

This object is achieved by a method according to the main claim.

BRIEF DESCRIPTION OF THE DRAWINGS

The invention is described in more detail by means of two further exemplary embodiments illustrated in the accompanying figures. In the drawing.

DETAILED DESCRIPTION OF THE PREFERRED EMBODIMENTS

Figure 1:
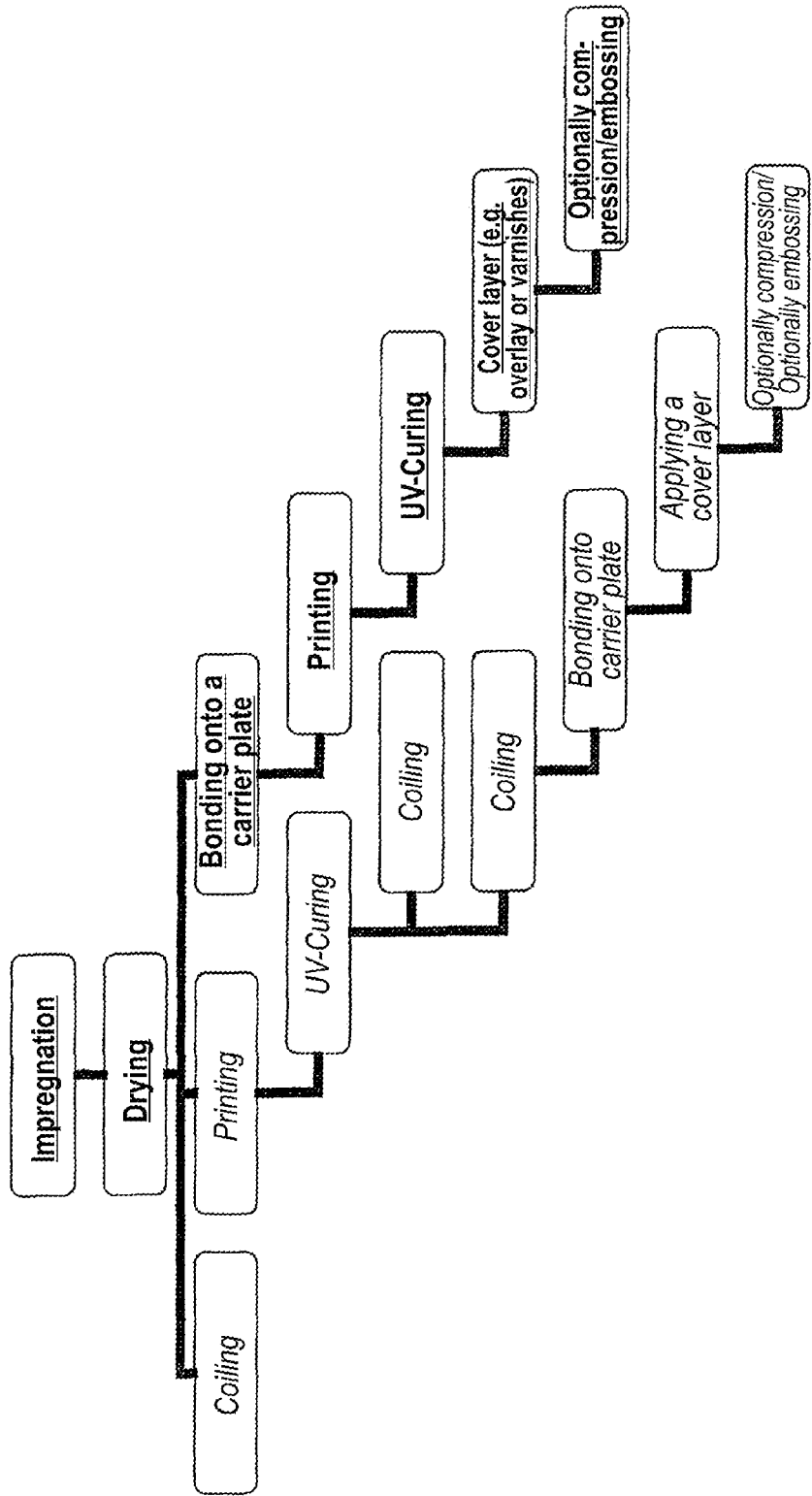
FIG. 1 shows a first embodiment of the method according to the invention with a non-printed cellulose non-woven fabric.

It has been found that when using the aqueous dispersion of a polymer cross-linkable by UV radiation as an impregnation agent, drying of the impregnate and curing the polymer by cross-linking by means of UV irradiation a decorated sheet can be obtained in a simple manner that exhibits no dimensional change with respect to the original cellulose non-woven fabric, which is compatible with the resins, in particular aminoplasts, used in other layers, such as cover layers, of the decorative laminate resins, provides a good bond and is completely water-resistant.

The non-woven fabric made of cellulose fibers used according to the invention except of optionally a small amount of binder for stabilizing the non-woven fabric preferably contains no further impregnating agents. Its weight per unit area is generally between 50 and 200 $g/m^2$. More preferably, the non-woven fabric is a paper. A preferred range for the weight per unit area of the paper is between 70 and 100 $g/m^2$. Print base papers known in the technical field of decorated surfaces can appropriately be used. These are generally not impregnated and may be colored and may contain pigment substances, such that they conceal the color and structure of the untreated carrier material.

According to the method of the invention the non-woven fabric made of cellulose fibers can be impregnated in a printed or unprinted state. In the first case the cross-linkable polymer is cross-linked and cured by UV irradiation after impregnating and drying. In the second case prior to the irradiation the decor has to be printed onto the impregnated and dried non-woven fabric. One advantage of this second embodiment is that for printing of the decor up to 50% less ink is required than in printing of a non-impregnated non-woven fabric. This may be attributed to the fact that the entire ink remains on the surface of the impregnated non-woven fabric and is not absorbed into the interior of the non-woven fabric, where it is no longer visible. Another advantage of printing on the impregnated and dried, but not yet irradiated non-woven fabric is the clearer and sharper printed image. Apparently, here the ink tends less to bleed than in printing on raw paper.

The polymer cross-linkable by UV-radiation used in the method according to the invention is in the form of an aqueous dispersion, which may optionally contain suitable surfactants as dispersants. The polymer may be a copolymer comprising cross-linkable comonomers, for example, ethylenically unsaturated compounds such as acrylates and methacrylates, which even after the polymerization have ethylenically unsaturated groups such as acrylic acid esters of polyhydric alcohols.

Preferably the cross-linkable polymer in addition to the ethylenically unsaturated comonomers comprises urethane units, which in a known manner may be composed of diisocyanates and diols. Anionic dispersions are particularly suitable.

Further preferred are polymers which in addition to the cross-linkable comonomer and the urethane units comprise ester units. The polymer may be present as a block copolymer. For example, polyester blocks can be incorporated into the copolymer by using as diol a preferably aliphatic polyester diol.

The aqueous dispersion of the polymer which is cross-linkable by UV radiation used according to the invention preferably has a solids content of at least 35 percent by weight. The dispersion may comprise further auxiliaries, such as defoamers and thickeners. The areal coating of the polymer dispersion is preferably such that a dry areal density of 10-40, more preferably 10-20 g/m$^2$ polymer is obtained. In general, a higher grammage and a larger pore volume of the cellulose non-woven fabric require a higher areal density of the polymer.

The impregnation of the non-woven fabric can be carried out by known methods, such as dipping the non-woven fabric into the polymer dispersion. However, dosing methods are preferred that allow a precise control of the areal density, for example, roller coating or curtain coating. In roller coating the impregnant is preferably pressed into the non-woven fabric by means of a counter-pressure roller. Also possible is the use of a doctor blade technique, such as in paper coating machines. Preferred is a roller coating process by use of rollers made of stainless steel or hard rubber.

For the impregnation the viscosity of the polymer dispersion can be increased by use of appropriate thickening agents, for example with compositions based on polyurethane.

After the impregnation of the non-woven fabric the aqueous dispersion medium is removed by drying. The drying can be implemented by physical means such as infrared irradiation, heated air, for example, in circulating air or nozzle dryers, microwaves, heated rollers, or a combination of these processes. It is advantageous if here the film-forming temperature of the dispersed polymer is exceeded, since as a result the water resistance of the impregnated non-woven fabric is improved. In addition to water itself optionally present polar auxiliary dispersion agents, such as alcohols, belong to the aqueous dispersion medium removed during the drying process.

It is a particular advantage of the method according to the invention that the impregnated cellulose non-woven fabric is flexible and non-tacky in the dry state, such that it can be coiled without any problem and stored and transported for further use. If necessary, the cellulose non-woven fabric can be cut at any stage of the method according to the invention, for example, in order to adapt it to the width of the impregnation or printing apparatus or to the dimensions of the carrier plate intended for the manufacture of the decorative laminate.

If the non-woven fabric has not yet been printed before the impregnation process, this is done according to the invention after the impregnation process, but before the cross-linking by UV radiation. It has been found that the adhesion of the printing inks is not satisfactory after the irradiation. As printing methods primarily offset printing, flexographic printing and digital methods, such as inkjet, transfer or laser printing come into consideration.

Herein, particularly preferred is a digital printing process, since here it is not necessary to work with a prefabricated printing form, the pattern of which repeats itself regularly. Because of these repetitions, the imitation of natural materials such as wood is only imperfect. It would be inefficient to change the printing form after each print in order to avoid the impression of repetition. With digital printing, however, it is possible to keep a large number of different patterns in digital format in stock without to change between the set-up times otherwise spent for changing the printing form. This benefit will also be available if during the production the material to be imitated is changed, for example, if another wood material should be chosen.

A further advantage of the digital printing processes is that they usually operate in a non-contact manner. This avoids a situation that the surface of the cellulose non-woven fabric already impregnated and dried but not yet irradiated with UV radiation is damaged. As printing processes, for example, inkjet printing processes with fixed or moving printing head, laser printing processes, such as with monochrome or colored toner powders, and heat transfer processes come into consideration. The use of radiation curable printing inks is advantageous because in UV irradiation anyhow necessary for the evaluation of the impregnation a strong bond of the printing inks with the impregnating agent in the non-woven fabric is implemented. However, according to the invention also other printing inks, for example, water- or solvent-based inks are suited.

In order to create special visual effects it is also possible to print the decor in two process steps, i.e. before and after the impregnation process. This can be advantageous if, for example, metallically reflective or opalescent printing inks are used.

The invention also includes the use of a decorated sheet according to the present invention in a method for producing a decorative laminate. Such a method comprises at least the steps of attaching the decorated sheet on a carrier plate; and
attaching a cover layer on the decorated sheet.

As a carrier plate any suitable material comes into consideration, such as wood, wood-based materials such as chipboards and fiberboards, plywood, sheets of thermosetting and thermoplastic materials, sheets of biological fibrous materials such as hemp fibers, cellulosic fibers (paper, cardboard and the like) or straw, ceramic materials such as fired clay, concrete, plaster and composites of two or more of said materials, such as plasterboard or fiber reinforced plastics. In carrier plates with stronger imperfections at the surface it may be necessary to apply a primer layer in order to compensate for these imperfections before attaching the decorated sheet.

For attaching the decorated sheet onto the carrier plate preferably an adhesive or glue is used. Examples include hot melt adhesives, dispersion adhesives, two-component adhesives, urea-formaldehyde glue, optionally with a hardener. Where necessary or advantageous, the effect of the adhesive or glue can be enhanced by applying pressure and/or heat.

A cover layer for protecting the decor is applied to the decorated sheet attached to the carrier plate. For this purpose all materials and processes known in the art are suited. For example, a so-called overlay may be used which usually consists of a cellulose non-woven fabric impregnated with a synthetic resin such as an aminoplast. On the other hand, it is also possible to apply a cellulose-free cover layer, for example, by applying and drying an aqueous solution of an aminoplast or an aminoplast precursor onto the decorative layer. It is also possible to spread a powder of a synthetic resin or a resin precursor onto the decorative sheet and to form a continuous layer by at least partially melting. The cover layer may also be formed from possibly radiation-curable varnishes. In this case the final hardness of the cover layer can be obtained by irradiation. Wear-reducing components can be incorporated into the cover layer, for example, hard particles of corundum, silicon carbide, glass and the like.

Preferably, the cover layer consists of an aminoplast resin or a precursor thereof, for example, an oligomer of an amino and an aldehyde compound, such as melamine and formaldehyde, respectively. In order to obtain the final hardness, this material yet has to be subjected to a heat treatment which is advantageously carried out under pressure. For this purpose, preferably the entire layer stack comprising the carrier plate, the decorated sheet an the cover layer is compressed and/or heated. This can be done for example in a so-called short-cycle press or even continuously in a double belt press. Prior to or during the compression, for example, by means of a suitable embossing plate, a surface structure, for example, for imitating wood pores, can be embossed into the surface of the cover layer. An advantage of the method according to the invention is that the decorated sheet, when printed with a decor prior to the impregnation, is not subjected to a dimensional change due to the impregnation and drying processes, so that the printed decor maintains its local coincidence with the surface structure.

Hereinafter an exemplary embodiment of the method according to the invention is described.

A paper web having a weight per unit area of 80 g/m$^2$ is guided through a pair of rollers, wherein both rollers are each coated by means of a squeegee device with 20 g/m$^2$ of a dispersion of a urethane-acrylic varnish-ester copolymer having 50 wt.-% solids content. In contacting with the paper the dispersion is pressed into the paper. After the coating process the paper web is passed through a dryer in which the web is irradiated with infrared radiation and vented. After passing the dryer the web passes through a printing station in which a four-color decor is printed onto one side of the web by means of a digital ink-jet printing process. Thereafter, the web is subjected to UV irradiation from both sides. Then, the thus produced decorated sheet is water-resistant and can be coiled and stored. Alternatively, it may immediately, optionally in a continuous operation, be glued onto an HDF board by use of a urea-formaldehyde glue. Even in this state, the intermediate product, that is, the carrier plate with the decorated sheet attached thereto, can optionally be stored for future use. For finishing a decorative laminate now an aqueous solution of a melamine-formaldehyde resin precursor is applied to the decorated surface, dried, and pressed in a short-cycle press at about 170° C. for 20 seconds. Thus, by means of an embossing plate a decor matching with the pore structure is embossed into the surface.

If a preprinted decorative paper is used for the impregnation, the printing process is omitted and the remaining process steps are carried out in the same manner.

FIG. 1 shows the successive steps in the first exemplary embodiment of the method according to the invention. Here, the underlined terms represent a preferred procedure, which makes the invention particularly advantageously usable. First, the cellulose non-woven fabric, which may be, for example, an unprinted paper, in particular a printing base paper, is impregnated with the impregnation agent according to the invention. Thereafter, the impregnated cellulose non-woven fabric is dried. In this state, the non-woven fabric can be coiled and stored or already be printed. However, preferably it is now adhered onto a carrier plate and is printed with a decorative pattern preferably by a digital printing process. This step is followed by a UV irradiation process until the impregnation is sufficiently cured. Now, a cover layer, such as an overlay (backing layer impregnated with a cover layer material), a solution of resin precursor or an optionally radiation-curable paint, may be applied onto the decorative pattern. Finally, the cover layer is bonded to the carrier plate and the decorative layer in a heated press under pressure and/or heat, wherein optionally a surface structure is embossed into the surface of the cover layer by means of a structured press plate. In this preferred procedure, one process step can immediately be followed by another one, such that the operation can be continuous, which allows for considerable cost advantages for large lots. On the other hand, the impregnated and dried cellulose non-woven fabric can be coiled up and intermediately stored before it is printed, irradiated with UV radiation, bonded onto the carrier plate, the cover layer is optionally applied and the layered compound structure is pressed and embossed. Herein, it is advantageous, that even after the printing process and the UV irradiation the decor material can yet be coiled up and stored. This facilitates for example the production of small lots with frequent product changeovers. It is also possible to interrupt the production process after bonding the decorative layer onto the carrier plate and to store the intermediate product.

Figure 2:
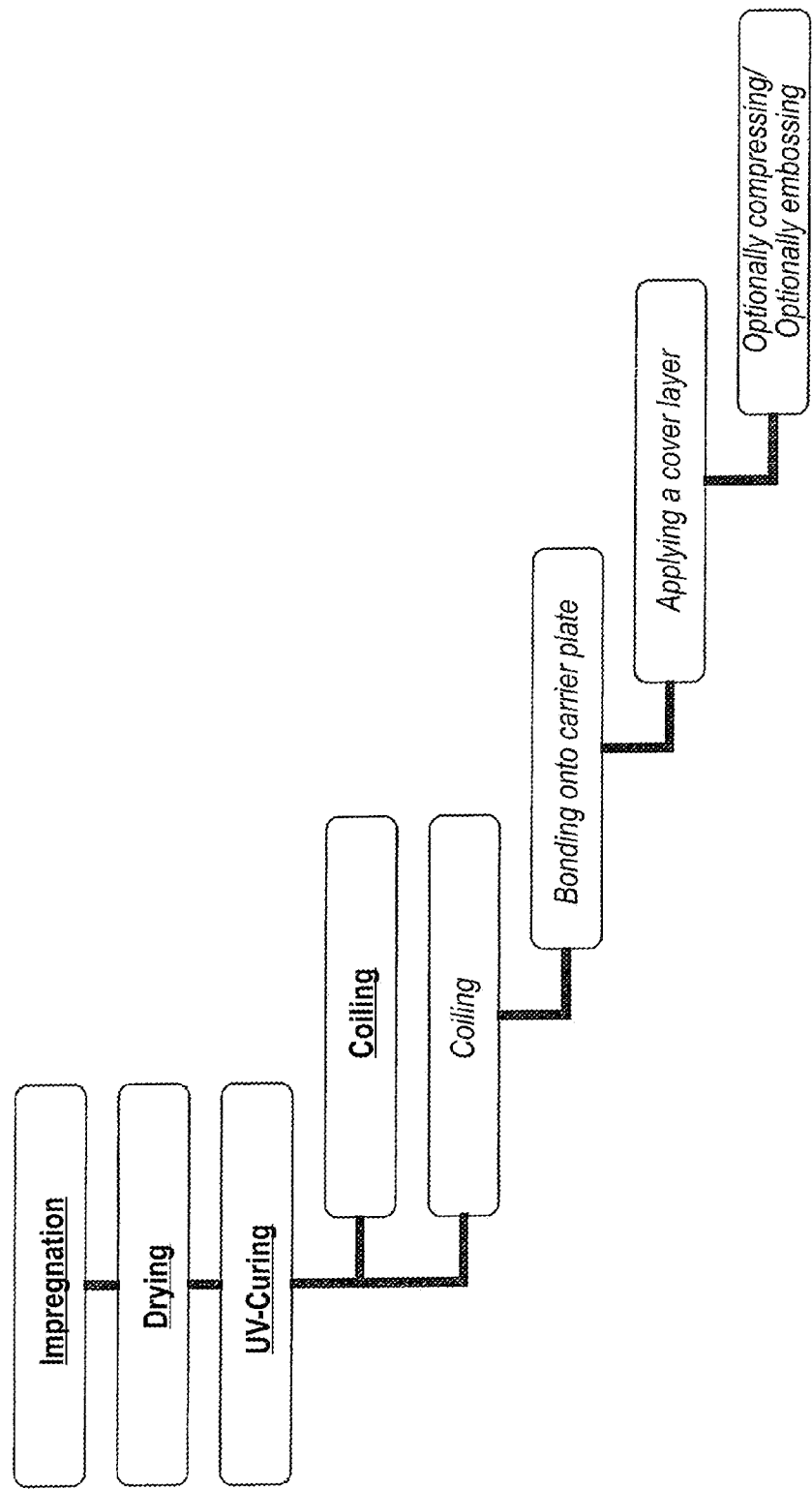
FIG. 2 shows a second embodiment of the method according to the invention with a preprinted decorative paper.

FIG. 2 shows exemplarily a second embodiment of the method according to the invention. Here, one starts from an already printed decorative paper. This is first impregnated with the composition according to the invention, dried and subjected to the UV irradiation. Preferably (underlined process steps) it is now coiled up and intermediately stored for further use. However, it can also immediately or after intermediate storage be bonded onto a carrier plate and a cover layer, such as described above, can be applied. The layer package now, in turn, can be treated with pressure and/or heat, wherein optionally also a structure is embossed into the surface.

The invention claimed is:

1. Method for producing a decorated sheet comprising the following steps, including a step of cross-linking/curing by UV radiation, in sequential order:
   providing an unprinted non-woven fabric of cellulosic fibers;

impregnating the unprinted non-woven fabric with an aqueous dispersion of a polymer which is cross-linkable by UV radiation to yield an impregnated, unprinted non-woven fabric;

removing the aqueous dispersion medium from the impregnated unprinted non-woven fabric by drying to yield a dried, impregnated, unprinted, non-woven fabric;

printing a decoration on one side of the dried, impregnated, unprinted, non-woven fabric prior to said cross-linking/curing by UV radiation to yield a printed, dried, impregnated, non-woven fabric; and curing the polymer in the printed, dried, impregnated, uncured, non-woven fabric by said cross-linking by means of UV irradiation.

2. Method according to claim 1, characterized in that the polymer which is cross-linkable by UV radiation is a copolymer comprising at least urethane and ethylenically unsaturated units.

3. Method according to claim 2, characterized in that the polymer which is cross-linkable by UV radiation further comprises ester units.

4. Method according to claim 3, characterized in that the non-woven fabric is paper.

5. Method according to claim 3, characterized in that the aqueous dispersion has a solids content of at least 35 wt. %.

6. Method according to claim 3, characterized in that the drying process is implemented by infrared radiation, heated air, microwaves, and/or heated rollers.

7. Method according to claim 3, characterized in that the printing process is implemented by offset printing, flexographic printing and/or a digital printing process.

8. Method according to claim 3, characterized in that:
the non-woven fabric is paper;
the aqueous dispersion has a solids content of at least 35 wt. %;
the drying process is implemented by infrared radiation, heated air, microwaves, and/or heated rollers; and
the printing process is implemented by offset printing, flexographic printing and/or a digital printing process.

9. Method according to claim 2, characterized in that the non-woven fabric is paper.

10. Method according to claim 2, characterized in that the aqueous dispersion has a solids content of at least 35 wt.-%.

11. Method according to claim 2, characterized in that the drying process is implemented by infrared radiation, heated air, microwaves, and/or heated rollers.

12. Method according to claim 2, characterized in that the printing process is implemented by offset printing, flexographic printing and/or a digital printing process.

13. Method according to claim 2, characterized in that:
the non-woven fabric is paper;
the aqueous dispersion has a solids content of at least 35 wt. %;
the drying process is implemented by infrared radiation, heated air, microwaves, and/or heated rollers; and
the printing process is implemented by offset printing, flexographic printing and/or a digital printing process.

14. Method according to claim 1, characterized in that the non-woven fabric is paper.

15. Method according to claim 1, characterized in that the aqueous dispersion has a solids content of at least 35 wt.-%.

16. Method according to claim 1, characterized in that the drying process is implemented by infrared radiation, heated air, microwaves, and/or heated rollers.

17. Method according to claim 1, characterized in that the printing process is implemented by offset printing, flexographic printing and/or a digital printing process.

18. Method according to claim 17, characterized in that the printing process is implemented by means of an ink jet, transfer or laser printing process.

19. The method of claim 1 further comprising, after said curing, attaching the non-woven fabric onto a carrier plate, followed by applying a cover layer over the non-woven fabric.

20. The method of claim 1 wherein the non-woven fabric is paper and the method further comprises, after said curing, attaching the non-woven fabric onto a carrier plate, followed by applying a cover layer over the non-woven fabric.

21. The method of claim 1 wherein the printing is with a UV curable printing ink and the cross-linking by means of UV irradiation which cures the polymer in the fabric also cures the UV curable printing ink.

22. The method of claim 1 consisting of the stated steps of the providing, the impregnating, the removing, the printing, and the curing.

23. Method for producing a decorated sheet comprising the following steps, including a step of cross-linking/curing by UV radiation, in sequential order:
providing an unprinted non-woven fabric of cellulosic fibers;
impregnating the unprinted non-woven fabric with an aqueous dispersion of a polymer which is cross-linkable by UV radiation to yield an impregnated, unprinted non-woven fabric;
removing the aqueous dispersion medium from the impregnated unprinted non-woven fabric by drying to yield a dried, impregnated, unprinted, non-woven fabric;
printing a decoration on one side of the dried, impregnated, unprinted, non-woven fabric prior to any curing to yield a printed, dried, impregnated, uncured, non-woven fabric; and
curing the polymer in the printed, dried, impregnated, uncured, non-woven fabric by said cross-linking by means of UV irradiation.

* * * * *